July 18, 1933.  W. L. PAUL  1,918,928
TILLAGE IMPLEMENT
Filed Sept. 27, 1928  3 Sheets-Sheet 1

Inventor.
William L. Paul,
By Brown, Jackson, Boettcher & Weimer.
Attorneys

Witness
Milton Lenoir

July 18, 1933.  W. L. PAUL  1,918,928
TILLAGE IMPLEMENT
Filed Sept. 27, 1928  3 Sheets-Sheet 2
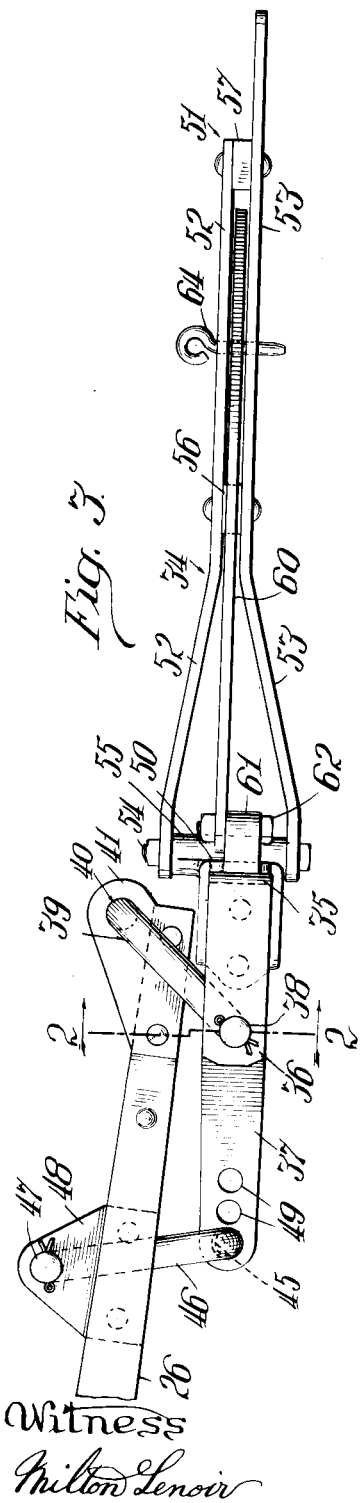
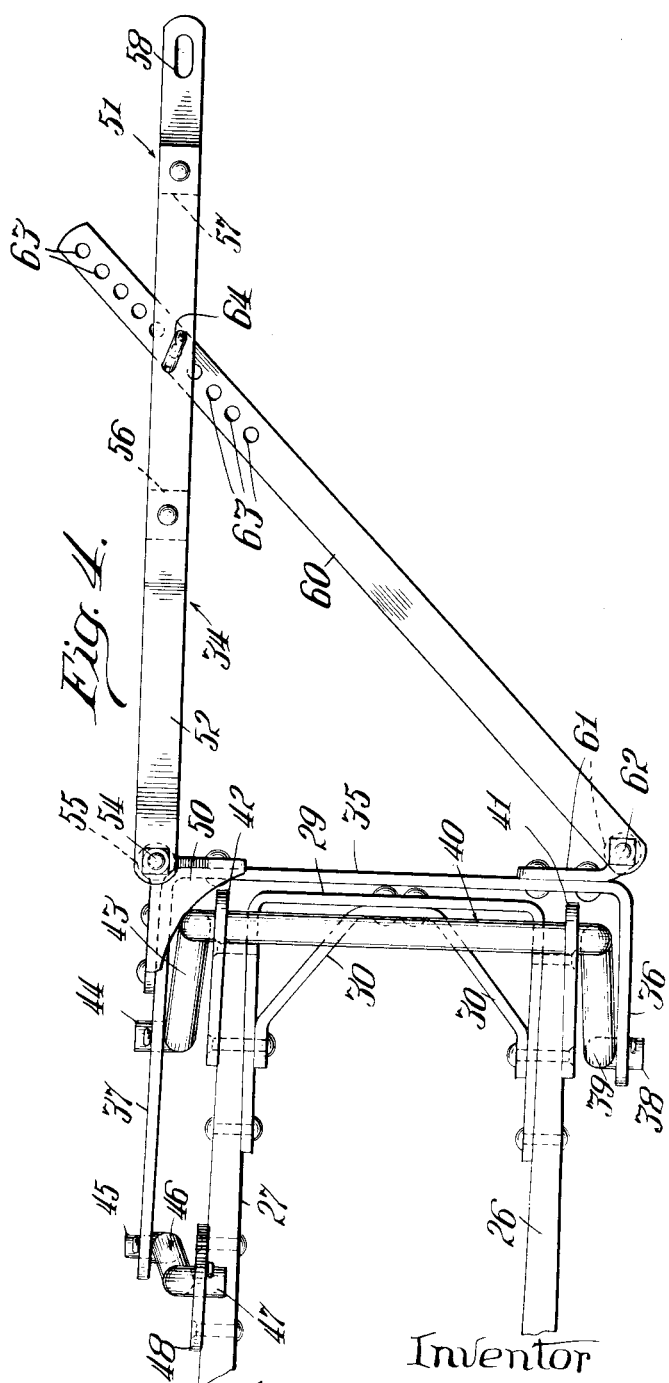
Inventor
William L. Paul,
Brown, Jackson, Boettcher & Dienner
Attorneys

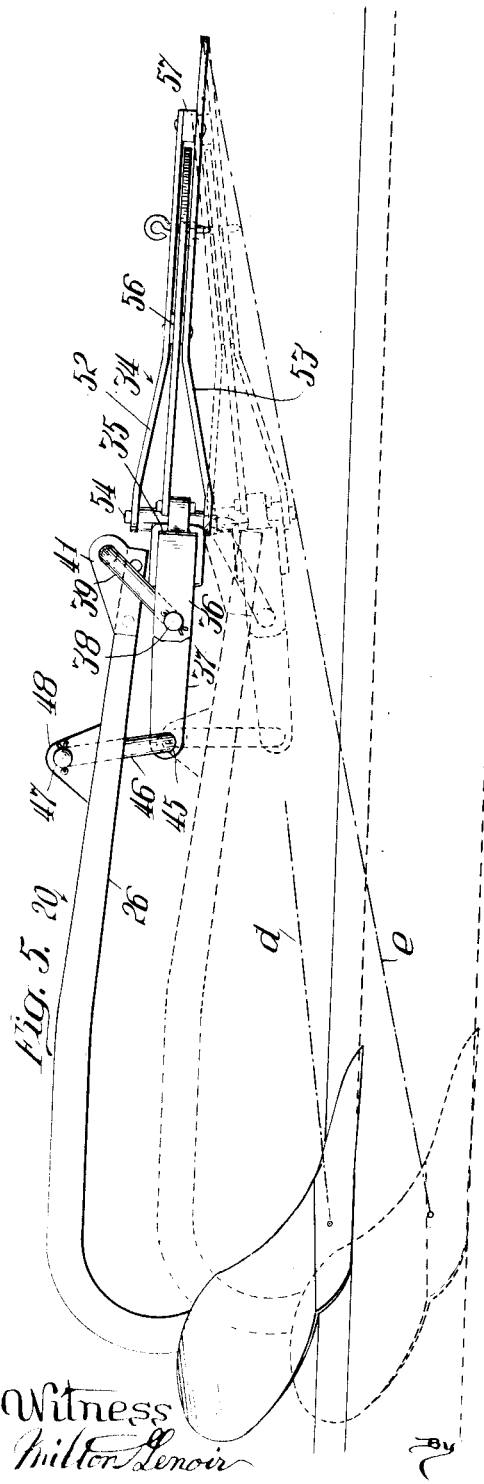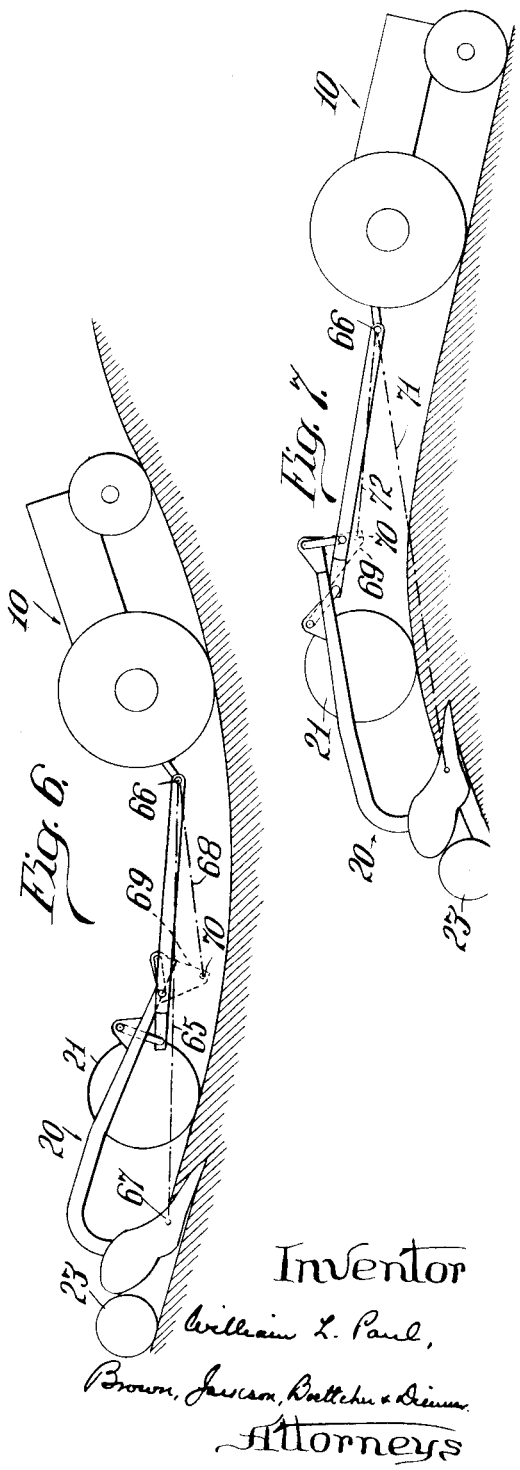

Patented July 18, 1933

1,918,928

UNITED STATES PATENT OFFICE

WILLIAM L. PAUL, OF BERKELEY, CALIFORNIA, ASSIGNOR TO DEERE & COMPANY, OF MOLINE, ILLINOIS, A CORPORATION OF ILLINOIS

TILLAGE IMPLEMENT

Application filed September 27, 1928. Serial No. 308,731.

This invention relates primarily to tillage implements such as plows, cultivators, planters and like machines used in farming operations that involve tillage of the soil to a greater or less extent, but it may also be advantageously applied to mowers, harvesters, and various other kinds of agricultural machinery. It has particularly to do with the means for transmitting power from the draft means, which may be either a tractor or a team, to the implement drawn by it. In the accompanying drawings I have chosen to show my invention as applied to a gang plow, as its use is especially advantageous in connection with such implements, and its characteristics and advantages may be more conveniently pointed out in that connection, but it should be understood that by so doing I have not intended to restrict my invention to such use, and that in the specification and claims the term "plow" is used generically to include any and all other implements in connection with which my improvements may appropriately be used, except in so far as the context may plainly show that reference is made to plows proper as distinguished from other implements.

My invention has to do with plows, or other implements, arranged to be flexibly hitched to suitable draft means, such as a tractor or team, for independent up and down swinging movement.

Heretofore in the case of plows proper, the general practice has been to provide the plow with a forwardly extending beam carrying a vertically disposed clevis provided with a number of holes at different distances from the ground, so that by means of such clevis the team or tractor could be attached to the plow at different distances from the ground to cause the plow bodies to run level, or substantially so, at the desired operating depth. By hitching at a higher point on the clevis the draft of the team becomes effective to tilt the point of the share downward and cause the plow to operate properly at a greater depth, while for shallower plowing the hitch is made at a lower point on the clevis. The use of such devices is, however, objectionable because it reduces the clearance at the front end of the beam and causes an accumulation of trash, and this is especially true with tractor drawn plows, because in the latter case it is necessary to hitch the plow to the tractor at a relatively low point to lessen the tendency of the front wheels of the tractor to rise when the tractor is at work and thereby avoid the danger of its tipping backward or of losing steering control of the tractor.

Manifestly, to operate to the best advantage a plow should run freely at the depth for which it is set without depending on downward force applied to it by the tractor to maintain it at such depth, but relying on its own suction for proper penetration, and to this end the hitch between the tractor and the plow should be arranged to provide in effect for transmitting the draft force from the tractor to the center of resistance of the plow bodies in the ground, in an approximately direct line representing the line of force between the hitch point on the tractor and such center of resistance of the plow. It is apparent that by transmitting the draft force to the plow in this way the imposition of unnecessary load on the tractor is avoided because in that case the only load sustained by it is that afforded by the resistance of the ground to the progress of the plow body through it at the predetermined plowing depth, whereas if the draft be applied to the plow beam at a considerable distance above the ground, and it is transmitted to the plow body through the beam in the ordinary way, considerable downward pressure is applied to the usual front furrow wheel and also the land wheel, which not only increases the load resistance but tends to lift the rear of the plow out of the ground, which disturbs its proper operation, reduces its efficiency, adds to the difficulty of the plowing operation, and consequently increases the power requirement and operating expense.

A further advantage of transmitting the draft force in a direct line from the tractor to a point at or near the center of resistance of the plow, as described, is that it locates the pivotal point of the effective draft connection to the plow in, or close to, the line of draft from the hitch point to the center of the load, so that the plow when it rises or falls, swings approximately in an arc whose radius is substantially equal to the distance from such center of resistance to the point of attachment of the hitch device to the tractor, and likewise, when the rear of the tractor rises and falls with respect to the plow, it swings through a like arc centered approximately at the center of resistance of the plow, the effect being similar to that that would be obtained if the tractor were hitched to the plow by a long rope or chain. Consequently, the proper operation of the plow remains unaffected by undulations of the ground over which the tractor is traveling, and in which the plow is operating, but it will run at the depth of penetration for which it is set without regard to such undulations; also the tractor is not affected by undulations of the ground through which the plow is being drawn. This result cannot be obtained where the plow is hitched to the tractor through a hitch of the clevis type, or other form of hitch in which the hitching devices normally retain a certain fixed relation, vertically, with respect to both the plow and the tractor.

In view, however, of the necessity of hitching to the tractor at a low point, transmission of the draft force from the tractor to the center of resistance of the plow along an approximately direct line locates the line of draft quite close to the ground, and makes it impractical to transmit the drawing force through physical parts lying substantially in such line, such as connections leading to the clevis above referred to, because to extend the clevis down far enough to accomplish the desired result would reduce clearance at the front of the plow to an objectionable extent,—indeed, in many cases would make necessary a clevis long enough to penetrate the ground. To provide a hitch device which gives the necessary clearance, through the location of the physical parts relatively high, or in a plane above the line of force between the tractor and the center of resistance of the plow bodies, and at the same time provide an arrangement of the connecting parts between the draft element and the plow, such that the same effect for the plow is obtained as though the draft connections extended in the line of force, and the forward end of the plow were extended down to connect therewith in such line of force, is the principal object of my present invention.

Other objects of my invention are to provide means by which, in addition to realizing the advantages above pointed out, the plow may be adjusted laterally with respect to the tractor as occasion may arise, but will normally be held against lateral swinging with respect to the tractor; to provide means for adjusting the draft connections to tilt the plow point downward to compensate for reduced suck incident to dullness caused by wear, and to provide for raising and lowering the plow bodies, and for adjusting the depth of plowing. The preferred means by which my several objects are accomplished is illustrated in the accompanying drawings, and is hereinafter described in detail, but it should be understood that my invention is not limited to embodiment in the specific form shown and described, as it may be practically applied in various other ways. The claims hereinafter made are, therefore, intended to be generic except as they may be directed to details of the form and arrangement shown.

Referring to the drawings,—

Fig. 3 is a side elevation showing the front portion of the plow frame and the draft connections;

Fig. 4 is a plan view of the parts shown in Fig. 3;

Fig. 5 is a side view of a diagrammatic character showing variations in the position of the draft connections with reference to the plow frame when plowing at different depths, a single plow body being shown as representing the approximate position of the center of load of a three bottom gang plow;

Fig. 6 is a diagrammatic view illustrating in full lines the position of my improved draft connections in traversing a swale or depression in the land, and indicating comparatively by dotted lines the different effect obtained under such conditions with such draft connections over the old form of clevis connection; and Fig. 7 is a view of similar character to Fig. 6 with the plow traversing a knoll or elevation of the ground.

Figure 1:
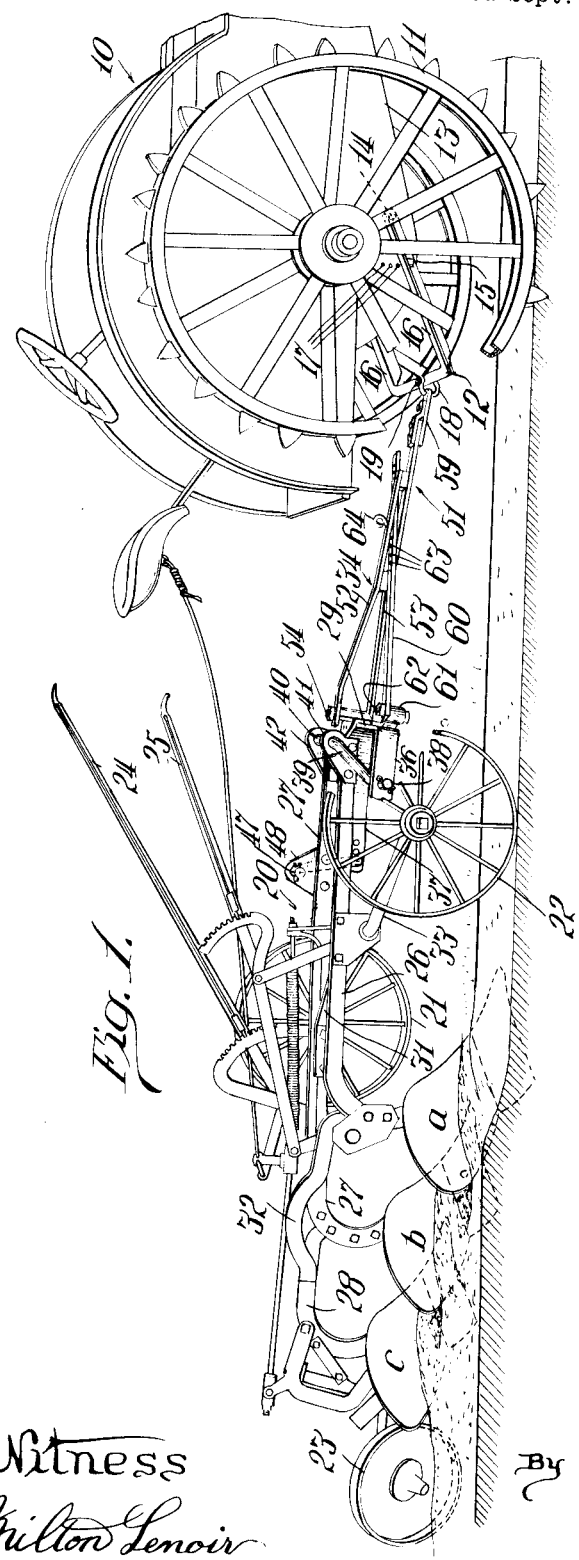
Fig. 1 is a perspective side view illustrating part of a tractor having a gang plow hitched thereto by means of my improved draft connections.
Figure 2:
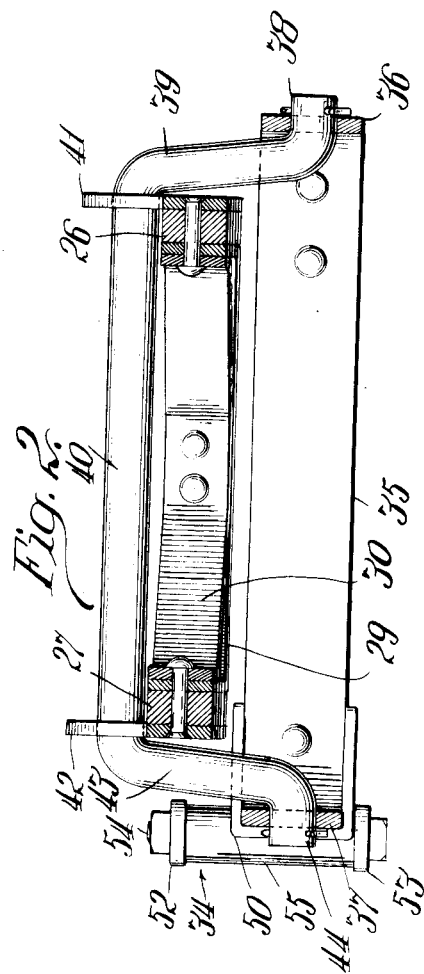
Fig. 2 is a detail, being an enlarged vertical cross-section on line 2—2 of Fig. 3.

Referring to the drawings, 10 indicates an ordinary farm tractor having rear traction wheels 11 and a draw bar 12 which in the illustrated arrangement is in the form of a bail pivoted at its forward ends to the tractor housing 13 by pivots 14 and normally held against vertical swinging by bolts 15 that extend through holes in the side members 16 of the bail and into one or another of a series of holes 17 in the housing. This provides for adjusting the rear portion of the bail up and down, and for holding it rigid in its different positions of adjustment. As shown in Fig. 1, the bail extends downward and rearward from its connection with the tractor, and its rear portion carries a vertically disposed clevis 18 or equivalent device for conveniently attaching the draft elements of the plow to the tractor. The clevis 18 is pivotally connected to the draw bar 12 by a vertically disposed pivot 19, so that the clevis may swing laterally about a vertical axis, and may be easily detached when desired.

The plow shown in the drawings, which is indicated as an entirety by the reference numeral 20, is an ordinary three-bottom power lift gang plow provided with a land wheel 21, a front furrow wheel 22 and a rear furrow wheel 23. It is also provided with a depth regulating lever 24 and a leveling lever 25 of well known construction, preferably arranged and operating substantially as shown in Strandlund Reissue Patent No. 15,828, dated April 29, 1924, for Wheeled plow. The power lift mechanism may also be of the half revolution clutch type shown in said patent, and the same is true as to other details of construction that have no special relation to my present invention. Reference is therefore made to said Strandlund patent for such details, but it should be understood that the improvements that constitute the subject-matter of my present application may be applied to plows of other design and also to other kinds of agricultural implements, the plow shown being merely exemplary.

In the plow shown in Fig. 1 there are three plow bodies designated a, b and c, respectively, each of which is provided with a forwardly extending beam designated 26, 27 and 28, respectively. The beams 26 and 27 extend forward in parallelism and are suitably braced together to form a rigid frame or beam structure, as best shown in Fig. 4. As there shown, a U-shaped brace 29 connects the forward ends of the beams 26, 27 and is reenforced by a V-shaped brace 30. A further brace 31 connects the rearward portions of said beams. The beam 28 of the rearmost plow body c is rigidly connected to the rearward portion of the beam 27 and is braced to the beam 26 by a brace 32, as shown in Fig. 1. The arrangement of these braces is, of course, not essential, as any other suitable construction may be employed. The landward side of the frame or beam structure, which, for convenience, will be termed the main beam, is supported on the land wheel 21 by a transverse crank axle, and the furrowward side of said main beam is supported on the furrow wheel 22 by a crank axle 33, as fully described in said Strandlund patent. Said crank axles are rocked to raise and lower the plow and to regulate the depth of plowing, by operation of the lever 24, and the furrow wheel axle 33 may be independently rocked for leveling purposes by operation of the lever 25.

Coming now to the improvements that constitute my present invention, by reference to Fig. 3 it will be seen that the main beam, comprising the parts 26, 27, is provided with a forwardly extending supplemental beam, designated as an entirety by the reference numeral 34. This supplemental beam is a normally rigid structure, although certain parts thereof are adjustable to adjust the position of the plow laterally with reference to the tractor or other draft power. In the construction shown, which is that which I prefer to use, this supplemental beam comprises a U-shaped member composed of a transverse portion 35 that extends across the front of the main frame, and rearwardly extending members 36, 37 that extend parallel with the members 26, 27 of the main beam, as best shown in Fig. 4. The member 36 is pivotally mounted upon the out-turned end 38 of a crank arm 39 which forms a part of a transversely disposed crank shaft 40, the end portions of which are journaled in brackets 41, 42 secured to the opposite members 26, 27 of the main beam. Obviously, by rocking the crank shaft 40 the arm 39 will be swung longitudinally of the main beam. At its opposite end the crank shaft 40 is provided with a similar crank arm 43, upon the out-turned end 44 of which is pivotally mounted the arm 37 at a point between its ends. Both the crank arms 39, 43 normally extend downward and rearward, as best shown in Figs. 3 and 4. The arm 37 of the frame 35 extends rearwardly beyond the crank end 44, and is pivotally connected to the out-turned end 45 of a swinging link 46, the upper end of which is bent inwardly, as shown at 47 in Fig. 4, and is journaled in a bracket 48 that rises from the side member 27 of the main beam as shown. The link 46 normally extends downward and forward at a converging angle to the crank arms 39 and 43, as best shown in Fig. 3. The arrangement is such that the U-shaped frame 35 is suspended by the downwardly converging links so that it occupies an approximately horizontal position in a plane below the forward portion of the main beam and is capable of being moved bodily fore and aft with respect to the main beam by the swinging of said links; furthermore, when so moved fore and aft it also moves bodily to change its angular position in a vertical plane with reference to the members 26, 27 of the main beam, that is to say, the fore and aft movement of said U-shaped frame coincidentally tilts or rocks it to a greater or less extent about a transverse axis to vary the distance of its front and rear end portions from the main beam. The extent of this rocking movement can be varied in various ways as by shifting the lower end of the link 46 to one or another of several holes 49 provided in the arm 37, as best shown in Fig. 3.

In the construction shown the frame 35, crank arms 39, 43, and the link 46 constitute draft transmitting means by which draft force is transmitted to the implement along a direct line extending rearwardly from the point of attachment of the pulling means to the center of resistance of the load, as is hereinafter more fully explained.

The crank arms or links 39, 43, and the link 46 converge toward a point below the plane of the supplemental beam that constitutes the effective point of connection between the latter beam and the main beam, since draft force applied to the supplemental beam is transmitted to the main beam substantially as if it were applied at such point of convergence to a rigid arm or clevis extending down from the main beam, except, of course, that in my present construction the point referred to is not fixed. The swinging links are so proportioned and arranged that the point toward which they converge is located substantially in the direct line of draft from the clevis 18 to the center of resistance of the plow, and, therefore, it will be apparent that the force of the draft will be practically ineffective to tilt the plow so as to cause it to run deeper into or up out of the ground. The supplemental beam is arranged to be connected with the tractor or other draft means by the draft member hereinafter described, the connection being such that as the position of the tractor changes with respect to the plow, as by change in the depth of plowing, or by travel over uneven ground, or by adjusting the height of the connection between the plow and the tractor, the ensuing movement of the supplemental beam with respect to the main beam and the swinging of the links incident to such movement, will shift the point of convergence of the links in such manner as to maintain it approximately in the direct line of draft from the clevis 18 to the center of resistance of the plow. Therefore, the draft force does not tend to tilt the plow in either direction to change the plowing depth, notwithstanding rise or fall of the tractor with reference to the plow or adjustment of the height of the connection between the tractor and the plow. Neither is it affected by manual adjustment of the depth of plowing. The shifting of the position of the point of convergence of the links is effected through their connection together by means of the supplemental beam, or its equivalent, in such manner that as the link 46 moves toward a vertical position the crank arms or links 39, 43 recede from a vertical position, or, in other words, approach a horizontal position, and vice versa.

At one corner the U-shaped frame 35 is provided with a bracket 50 which reenforces it and at the same time provides convenient means for attachment to said frame of a forwardly extending draft member 51, which, as shown in Fig. 3, is in the form of a yoke, it being composed of upper and lower bars 52, 53, the forward ends of which are parallel with each other and are preferably spaced a short distance apart, while their rear ends diverge and are pivotally connected with the bracket 50 by a vertical pivot 54. Said bracket is provided with a boss 55 that is embraced by the bars 52, 53 and forms a bearing for the vertical pivot 54. The parallel forward portions of the bars 52, 53 are spaced apart by blocks 56, 57, and as shown in Fig. 3, and the lower bar 53 preferably extends forward of the bar 52 and is provided with a slot 58 to receive a coupling member 59, shown in Fig. 1, by which connection is made with the clevis 18. By reason of its pivotal connection with the U-shaped member 35, the draft member 34 may be swung laterally about the pivot 54, and to hold it in its various positions of adjustment the bar 60 is provided, the rear end of which is connected to a bracket 61 secured to the opposite side of the U-shaped member 35. The connection between the bracket 61 and the bar 60 is by means of a vertical pivot 62, best shown in Figs. 3 and 4. The forward end of the bar 60 is provided with a number of holes 63, and such forward end extends between the parallel portions of the members 52, 53 and may be secured thereto by a vertically disposed pin 64. By this means the forward end of the draft member 34 may be secured either in a position of parallelism with the main beam of the plow, or it may be swung laterally to a position of greater or less angularity therewith, to change the position of the plow laterally with respect to the tractor.

From the foregoing description it should be apparent that the supplemental beam 34, made up of the U-shaped frame 35 and the forwardly extending draft member 51, is a normally rigid structure, since when the bar 60 is secured to the bars 52, 53 it is incapable of deflection, either vertically or laterally. Furthermore, it also constitutes a laterally rigid forward extension of the main beam, by which it is connected with the tractor or other draft power in such manner as to permit vertical or lateral movement of the plow with reference to the tractor about the clevis 18 as a center. By reason, however, of the fore and aft swinging draft connections, such as the links 39, 43, and 46, between the supplemental beam and the main beam, the draft force from the tractor is effectually transmitted to the plow from a point at or near the center of resistance of the plow bodies in the ground, and is, in effect, applied to the plow beam from a point lying approximately in a direct line between the hitch point on the tractor and approximately such center of resistance. This effective line of draft, in the implement illustrated, is at a downwardly and rearwardly divergent angle to the longitudinal plane of the supplemental beam, which may therefore be physically connected quite close to the main beam, so as to be supported at a sufficient distance above the ground to provide adequate clearance under all operating conditions. This direct transmission of the draft force is obtained regardless of relative vertical movement between the plow bodies and the rear of the tractor, caused for example by traveling over undulating ground, since if the tractor rises or drops with respect to the plow bodies, the swinging movement of these parts with respect to each other is approximately in an arc centered either at or near the center of resistance of the plow bodies, or at the point of connection of the draft connection with the tractor.

For a like reason the shifting of the hitch point to a higher or lower point on the tractor has no objectionable effect on the plow. Therefore, the plow is free to operate at the depth for which it is set without being disturbed by relative up and down movement of the tractor, and as the draft force is transmitted in a direct line to approximately the center of resistance of the plow bodies there is no abnormal downward pressure on the supporting wheel or wheels, and consequently no unnecessary increase in the draft. It should be explained in this connection, however, that it is desirable to exert some slight downward pressure on said wheels when the plow is in operation in order to give stability, and traction sufficient to lift the plows when desired. This is accomplished by so adjusting the link connections between the main beam and the supplemental beam as to locate the effective point of application of the draft to the plow bodies at a point a short distance in advance of the center of resistance, and slightly above the line of draft, which causes the plow points to be directed slightly downward from a true level position. Such adjustment is also effective to compensate for reduced suction incident to wearing away of the plow points, by causing them to tilt downward to a sufficient extent to give them the requisite penetration. Furthermore, under some operating conditions it is desirable that the effective point of application of the draft to the plow be located some little distance above and forward of the center of resistance, and this also may be effected by adjusting the point of connection of the link 46 with the supplemental beam, as by shifting it from one to another of the holes 49.

Shifting it forward raises the effective point of application of the draft to the plow and also advances it, so that by providing a sufficient number of holes a wide range of adjustment may be obtained without materially moving the effective point of application of the draft away from the effective line of draft between the point of connection of the draft elements to the tractor and the center of resistance of the load. The depth of plowing can be altered by means of the depth adjusting lever without changing any of the draft connections or materially affecting clearance. As the plow floats irrespective of the tractor, which neither presses it into the ground nor pulls it out of the ground, it may be set for either very shallow plowing or for deep plowing, and will maintain its set position regardless of undulations of the ground and of variations in the character of the soil.

Fig. 5 illustrates in full lines the position of the parts for shallow plowing, and in dotted lines their position for deep plowing. Under the latter condition the forward end of the main beam occupies a position closer to the ground, which carries the rear portion of the supplemental beam to a downwardly and rearwardly inclined position and rocks it to a more pronounced rearwardly divergent angle to the main beam. This rocking movement deflects the effective line of draft from its former position toward alinement with the altered center of resistance and locates the pivotal center of the plow at or near such point. This shifting movement follows automatically from the change in the depth adjustment, and does not necessitate any change in the point of attachment of the draft connections to the tractor. The dotted lines d and e in said figure indicate the lines of draft force in shallow and deep plowing, respectively.

In Fig. 6 is illustrated in full lines the position of my improved draft connections where the plow is traversing a swale or depression in the land, with the tractor on the up hill side and the plow on the down hill side. In such case the effective line of draft is indicated by the dotted line 65 which extends in a straight line from the point of connection of the plow with the tractor, indicated by 66, and the center of resistance indicated at 67. The dotted line 68 in said figure illustrates the effective line of draft where the old type of clevis connection is used, 69 indicating such a clevis depending from the forward end of the plow beam. It will be noted that the line of draft 68 at the point of connection 70 with the clevis 69 is carried quite low by the downward tilting of the beam, so that the draft exerts an upward pull on the beam and tends to cause the plow bodies to run out of the ground, whereas with my improved connecting devices such is not the case. In the illustration of Fig. 7 the dotted line 71 shows the effective line of draft obtained by my improved connection where the plow is traversing a knoll or rise in the ground, with the tractor on the down hill side and the plow on the up hill side, and the dotted line 72 indicates the effective line of draft with the old form of clevis connection under like conditions. As there indicated, with the old form of connection the draft tends to pull the front end of the beam downward and causes the plow to run deeper into the ground, whereas with my improved connecting devices this does not occur.

From the foregoing description it will be seen that by connecting the main beam of a plow with the draft power by means of a rigid supplemental beam mounted in such angular relation to the main beam as to establish an effective line of draft that extends rearwardly from the point of connection of the supplemental beam with the tractor, and transmits the draft force from the tractor to or near the center of resistance of the plow bodies in the ground in an approximately direct line, and by so designing the connections between the beams that they are capable of varying the angular relation of the supplemental beam to the main beam under changing operating conditions to maintain such effective line of draft, I am able to locate the physical connections between the tractor and the main beam, at a point high enough to insure proper clearance under all conditions, and at the same time accomplish the other desirable results heretofore pointed out. While I prefer to connect the supplemental beam with the main beam by means of the swinging links shown and described, my invention is not limited to that form of connection, but includes any other equivalent means for the purpose. In cases where it is desirable that the effective hitch point be deflected laterally at one side of the machine instead of downwardly, this may be accomplished by positioning the links or equivalent connections in a horizontal plane or in an inclined plane instead of in a vertical plane, as in the illustrated arrangement, and all such arrangements are therefore comprehended within the scope of my generic invention.

It is to be understood that the term "frame" as used in the specification and claims is employed generically to indicate the member that carries the operating part or parts of the implement, whether it be a plow beam, a gang plow frame, or some other structure to which the draft is to be applied.

I claim:

1. A draft connection for farm implements provided with a frame by which the working devices are carried, such draft connection comprising a draft member adapted to be pivotally connected at the front with pulling means, and draft transmitting means connecting said draft member with said frame to move angularly relatively thereto, and coincidently endwise with respect thereto.

2. A draft connection for farm implements provided with a frame by which the working devices are carried, such draft connection comprising a draft member adapted to be pivotally connected at the front with pulling means, and draft transmitting means connecting said draft member with said frame and operable by movement of the front end of the draft member relatively to the frame, to swing the same angularly and coincidently move it endwise, relatively to said frame.

3. A draft connection for farm implements provided with a frame by which the working devices are carried, such draft connection comprising a draft member adapted to be pivotally connected at the front with pulling means, and draft transmitting means in the form of converging, fore and aft swinging, links, connecting said draft member with said frame to move angularly relatively thereto, and coincidently endwise.

4. A draft connection for farm implements provided with a frame by which the working devices are carried, such draft connection comprising a draft member adapted to be pivotally connected at the front with pulling means, and draft transmitting means in the form of downwardly converging, fore and aft swinging, links pivotally mounted at their upper ends on said frame, their lower ends being spaced apart and pivotally connected with the draft member, whereby said draft member may be moved, relatively to the frame, angularly in a vertical plane and coincidently endwise.

5. A draft connection for farm implements provided with a frame by which the working devices are carried, such draft connection comprising a draft member adapted to be pivotally connected at the front with pulling means, and draft transmitting means connecting said draft member with said frame to move angularly relatively thereto, and coincidently endwise, said draft transmitting means being adjustable to vary the movement of said draft member.

6. A draft connection for farm implements provided with a frame by which the working devices are carried, such draft connection comprising a draft member adapted to be pivotally connected at the front with pulling means, and draft transmitting means in the form of downwardly converging, fore and aft swinging, links, connecting said draft member with said frame to move, relatively thereto, angularly in a vertical plane and coincidently endwise, said draft transmitting means being adjustable to vary the movement of said draft member.

7. A draft connection for tillage implements provided with a rigid main beam by which the tilling devices are carried, such draft connection comprising a rigid supplemental beam adapted to be pivotally connected at the front with pulling means, and draft transmitting means connecting said supplemental beam with said main beam to move, relatively thereto, angularly in a vertical plane and coincidently endwise, said supplemental beam including parts laterally adjustable to shift the point of application of the draft.

8. The combination with an implement frame, of means adapted to connect said frame with pulling means for free floating relative movement, comprising a normally rigid draft member, and means constituting a movable draft transmitting connection between said draft member and said frame arranged to cause said draft member to move bodily with respect to said frame, under the force of the draft, to transmit the draft force to said frame virtually from a point lying approximately in a direct line between the point of application of the draft force to said draft member and the center of resistance of the load.

9. The combination with an implement frame, of means adapted to connect said frame with pulling means for free floating relative movement, comprising a normally rigid draft member, and means constituting a movable draft transmitting connection between said draft member and said frame arranged to permit said draft member to move bodily with respect to said frame, and to control the position of said draft member relative to said frame when the implement is being pulled so that the draft force will be transmitted to said frame virtually from a point displaced laterally from said frame and draft member toward a direct line between the point of application of the draft force to said draft member and the center of resistance of the load.

10. The combination with an implement frame, of means adapted to connect said frame with pulling means for free floating relative movement, comprising a normally rigid draft member, and means constituting a movable draft transmitting connection between said draft member and said frame arranged to permit said draft member to move bodily with respect to said frame, and to control the position of said draft member relative to said frame when the implement is being pulled so that the draft force will be transmitted to said frame virtually from a point displaced laterally from said frame and draft member toward a direct line between the point of application of the draft force to said draft member and the center of resistance of the load, said draft transmitting connection being adjustable to vary the operating position of said draft member with respect to said frame.

11. The combination with an implement frame, of means adapted to connect said frame with pulling means for free floating relative movement, comprising a normally rigid draft member, and means constituting a movable draft transmitting connection between said draft member and said frame arranged to cause said draft member to move bodily with respect to said frame, under the force of the draft, to transmit the draft force to said frame virtually from a point lying approximately in a direct line between the point of application of the draft force to said draft member and the center of resistance of the load, said draft member being adjustable to vary the lateral position of the point of its connection with the pulling means with respect to the implement frame.

12. The combination with an implement frame, of means adapted to connect said frame with pulling means for free floating relative movement, comprising a normally rigid draft member, and means constituting a movable draft transmitting connection between said draft member and said frame arranged to permit said draft member to move bodily with respect to said frame, and to control the position of said draft member relative to said frame when the implement is being pulled so that the draft force will be transmitted to said frame virtually from a point displaced laterally from said frame and draft member toward a direct line between the point of application of the draft force to said draft member and the center of resistance of the load, said draft member being adjustable to vary the lateral position of the point of its connection with the pulling means with respect to the implement frame.

13. A draft connection for farm implements comprising a normally rigid draft member adapted to be pivotally connected at the front with pulling means, and draft transmitting means connecting said draft member with the implement to move bodily relatively to the implement under the force of the draft to transmit draft force thereto virtually from a point lying in a direct line extending rearwardly from the pivotal connection of said draft member with the pulling means below and spaced from said draft member and its connections with the implement.

14. The combination with an implement frame, of a draft member adapted to be pivotally connected with pulling means, and draft transmitting means connecting said draft member with said frame to move angularly and endwise relatively thereto.

15. The combination with an implement frame, of a draft member adapted to be pivotally connected with pulling means, and draft transmitting means suspending said draft member from said frame to move endwise and angularly relatively thereto.

16. The combination with an implement frame, of a draft member adapted to be pivotally connected with pulling means, and draft transmitting means comprising fore and aft swinging links connecting said draft member with said frame to move angularly and endwise relatively thereto.

17. The combination with an implement frame, of a draft member adapted to be pivotally connected with pulling means, and draft transmitting means comprising fore and aft swinging links connecting said draft member with said frame to move angularly and endwise relatively thereto, said links being pivotally mounted on the frame at longitudinally spaced points and converging toward the draft member, and pivotally connected therewith at longitudinally spaced points.

18. The combination with a plow beam, of a draft member adapted to be pivotally connected with pulling means and having a portion underlying and spaced vertically from said beam, and draft transmitting means suspending said draft member from said beam to swing endwise and angularly relatively thereto.

19. The combination with a plow beam, of a draft member adapted to be pivotally connected with pulling means and having a portion underlying and spaced vertically from said beam, and draft transmitting links suspending said draft member from said beam to swing endwise and angularly relatively thereto, said links being pivotally mounted on the beam at longitudinally spaced points, and converging downwardly and pivotally connected with the draft member at longitudinally spaced points.

20. The combination with an implement frame, of a draft member adapted to be pivotally connected with pulling means, and draft transmitting means comprising fore and aft swinging links connecting said draft member with said frame to move angularly and endwise relatively thereto, said draft transmitting means being adjustable to vary the operating position of said draft member.

21. The combination with an implement frame, of a draft member adapted to be pivotally connected with pulling means, and draft transmitting means comprising fore and aft swinging links connecting said draft member with said frame to move angularly and endwise relatively thereto, one of said links being adjustable with respect to the other to vary the operating position of said draft member.

22. The combination with an implement frame, of a normally rigid draft member adapted to be pivotally connected with pulling means, and draft transmitting means connecting said draft member with said frame to move angularly and endwise relatively thereto, said draft member being adjustable to vary the point of its connection with the pulling means with respect to the implement frame.

23. The combination with an implement frame, of a normally rigid draft member comprising front and rear members, the front member being adapted to be pivotally connected with pulling means and being laterally adjustable with respect to said rear member, and draft transmitting means connecting said rear member with said frame to move angularly and endwise relatively thereto.

24. The combination with a plow comprising a beam and a furrow opener, of a normally rigid draft member adapted to be pivotally connected at the front with pulling means, and means connecting the rear portion of the draft member with the plow beam to move angularly in a vertical plane, and endwise, with respect thereto, under the force of the draft, said connecting means comprising cooperating members arranged to transmit draft force to the beam virtually from a point below and spaced from said beam and draft member.

25. The combination with a plow comprising a beam and a furrow opener, of a normally rigid draft member adapted to be pivotally connected at the front with pulling means, and means connecting the rear portion of the draft member with the plow beam to move angularly in a vertical plane, and endwise, with respect thereto, under the force of the draft, said connecting means comprising cooperating members arranged to transmit draft force to the beam virtually from a point below and spaced from said beam and draft member, and lying approximately in a direct line from the center of resistance of the plow to the point of connection of the draft member with the pulling means.

26. The combination with a farm implement adapted to be pulled, of a draft connection comprising a movable draft member adapted to be pivotally connected with pulling means, and means connecting said draft member with said implement for transmitting draft force from the draft member to the implement, said connecting means permitting movement of said draft member with respect to the implement so that the point of connection of the draft member with the pulling means may swing with respect to the implement in substantially an arc the center of which lies below a horizontal plane passing through the lowermost point of said connecting means.

27. The combination with a farm implement adapted to be pulled, of a draft connection comprising a movable draft member adapted to be pivotally connected with pulling means, and means connecting said draft member with said implement for transmitting draft from the draft member to the implement, said connecting means permitting movement of said draft member with respect to the implement so that the point of connection of the draft member with the pulling means may swing with respect to the implement in substantially an arc the center of which lies rearwardly of a transverse vertical plane passing through the rearmost point of said connecting means.

28. The combination with a farm implement adapted to be pulled, of a draft connection comprising a movable draft member adapted to be pivotally connected with pulling means, and means connecting said draft member with said implement for transmitting draft from the draft member to the implement, said connecting means permitting movement of said draft member with respect to the implement so that the point of connection of the draft member with the pulling means may swing with respect to the implement in substantially an arc the center of which lies below a horizontal plane passing through the lowermost point of said connecting means and rearwardly of a transverse vertical plane passing through the rearmost point of said connecting means.

29. A draft connection for farm implements adapted to be pulled, comprising a draft member adapted to be pivotally connected at the front with the pulling means, and draft transmitting means connecting said draft member with the implement to move bodily relatively to the implement under the force of the draft so as to cause the draft force to be transmitted through said draft member to the implement virtually from a point displaced laterally therefrom toward a direct line extending rearwardly from the pivotal connection of said draft member with the pulling means approximately toward the center of resistance of the load.

30. A draft connection for farm implements adapted to be pulled, comprising a draft member adapted to be pivotally connected at the front with the pulling means, and draft transmitting means connecting said draft member with the implement to move bodily angularly and fore and aft with respect thereto under the force of the draft, so as to cause the draft force to be transmitted through said draft member to the implement virtually from a point lying approximately in a line extending rearwardly from the pivotal connection of said draft member with the pulling means approximately toward the center of resistance of the load.

31. The combination with a farm implement adapted to be pulled, of a draft connection comprising a draft member interposed between the implement and suitable pulling means, and draft transmitting means connecting said draft member with the implement to move bodily angularly and fore and aft with respect thereto, under the force of the draft, to cause the draft force to be transmitted to the implement virtually from a point displaced laterally therefrom toward a direct line extending rearwardly from the point of connection of the draft member with the pulling means approximately toward the center of resistance of the load.

32. The combination with a farm implement adapted to be pulled, of a draft connection comprising a draft member interposed between the implement and suitable pulling means, and draft transmitting means swingingly connecting said draft member with the implement to move bodily with respect thereto under the force of the draft, and cooperating therewith to transmit the draft force to the implement virtually from a point displaced laterally therefrom toward an effective line of draft extending rearwardly from the point of connection of said draft member with such pulling means approximately toward the center of resistance of the load.

33. The combination with a farm implement adapted to be pulled, of a draft connection comprising a draft member adapted to be pivotally connected at the front with pulling means, and means swingingly connecting said draft member with the implement to move bodily relatively thereto by the force of the draft, said connecting means operating to transmit draft force applied to said draft member to said implement virtually from a point lying approximately in an effective line of draft extending rearwardly from the pivotal connection of said draft member with the pulling means approximately toward the center of resistance of the load.

34. The combination with a farm implement adapted to be pulled, of a draft connection comprising a draft member adapted to be pivotally connected at the front with pulling means, and means connecting said draft member with the implement to move bodily angularly and fore and aft relatively thereto by the force of the draft, said connecting means operating to transmit draft force applied to said draft member to the implement virtually from a point lying approximately in an effective line of draft extending rearwardly from the pivotal connection of said draft member with the pulling means approximately toward the center of resistance of the load.

35. The combination with a farm implement adapted to be pulled, of a draft connection comprising a draft member adapted to be pivotally connected at the front with pulling means, and draft transmitting means swingingly connecting the rearward portion of said draft member with the implement to move bodily relatively thereto by the force of the draft, to transmit draft force to the implement virtually from a point at one side of the plane of said draft member, and spaced rearwardly from the point of connection of said draft member with the pulling means.

36. The combination with a farm implement adapted to be pulled, of a draft connection comprising a longitudinally extending draft member adapted to be pivotally connected at the front with pulling means, and draft transmitting means connecting the rearward portion of said draft member with the implement to move bodily relatively thereto by the force of the draft, said draft transmitting means being arranged to cooperate with said draft member to establish a pivotal center, located approximately at the center of resistance of the load, about which the point of connection of said draft member with the pulling means may swing without affecting the operating position of the implement.

37. The combination with an implement having soil working means, of a draft connection therefor comprising a longitudinally extending draft member adapted to be connected at the front with pulling means, and means movably connecting the rearward portion of said draft member with the implement, such connecting means being arranged and operating to cause said draft member to move bodily relatively to the implement under the force of the draft to transmit the draft force to the implement virtually from a point lying approximately in an effective line of draft extending in a direct line rearwardly from the point of connection of said draft member with the pulling means toward the center of resistance of the load and below the point of connection of said draft member with the implement, to permit the soil working means and the pulling means to rise and fall independently of each other.

38. A draft connection for farm implements comprising a normally rigid draft member adapted to be pivotally connected at the front with pulling means, and draft transmitting means connecting said draft member with the implement to move bodily relatively to the implement under the force of the draft to transmit draft force thereto virtually from a point lying in a direct line extending rearwardly from the pivotal connection of said draft member with the pulling means below and spaced from said draft member and its connections with the implement, said draft connection being adjustable to shift the point of application of the draft laterally with respect to the implement.

39. The combination with a plow having a main beam, furrow openers carried thereby, and means operable to adjust the furrow openers to vary the depth of plowing, of a draft connection comprising a rigid supplemental beam adapted to be pivotally connected at the front with pulling means, and draft transmitting means connecting the rearward portion of said supplemental beam with the main beam to move bodily relatively thereto under the force of the draft to transmit draft force to the plow virtually from a point lying in a direct line extending rearwardly from the pivotal connection of said supplemental beam with the pulling means below and spaced from said supplemental beam and its connections with the implement.

40. The combination with a plow having a main beam, furrow openers carried thereby, and means operable to adjust the furrow openers to vary the depth of plowing, of a draft connection comprising a rigid supplemental beam adapted to be pivotally connected at the front with pulling means, and draft transmitting means connecting the rearward portion of said supplemental beam with the main beam to move bodily relatively thereto under the force of the draft to create an effective line of draft extending rearwardly from the pivotal connection of said supplemental beam with the pulling means, in a direct line approximately toward the center of resistance of the load.

41. The combination with an implement frame, of a draft member adapted to be pivotally connected with pulling means, and draft transmitting means connecting said draft member with said frame to move bodily relatively thereto and to transmit the draft force to said frame virtually from a point lying outside of the physical limits of said draft member.

42. The combination with an implement frame, of a draft member adapted to be pivotally connected with pulling means, and draft transmitting means comprising fore and aft swinging links connecting said draft member with said frame to move bodily relatively thereto and to transmit the draft force to said frame virtually from a point lying outside of the physical limits of said draft member.

WILLIAM L. PAUL.